(12) United States Patent
Choi

(10) Patent No.: US 10,162,780 B2
(45) Date of Patent: Dec. 25, 2018

(54) PCI EXPRESS SWITCH AND COMPUTER SYSTEM USING THE SAME

(71) Applicant: Electronics and Telecommunications Research Institute, Daejeon (KR)

(72) Inventor: Yong-Seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 440 days.

(21) Appl. No.: 13/958,241

(22) Filed: Aug. 2, 2013

(65) Prior Publication Data

US 2014/0173167 A1 Jun. 19, 2014

(30) Foreign Application Priority Data

Dec. 17, 2012 (KR) .................. 10-2012-0147203

(51) Int. Cl.
*G06F 13/40* (2006.01)
*G06F 12/08* (2016.01)
(Continued)

(52) U.S. Cl.
CPC .......... *G06F 13/4022* (2013.01); *G06F 12/08* (2013.01); *G06F 13/20* (2013.01); *G06F 13/36* (2013.01)

(58) Field of Classification Search
CPC .......... G06F 12/08; G06F 13/20; G06F 13/36; G06F 13/4022
(Continued)

(56) References Cited

U.S. PATENT DOCUMENTS

2003/0145194 A1* 7/2003 O'Shea ................ G06F 15/177
713/1
2006/0159115 A1 7/2006 Haneda et al.
(Continued)

FOREIGN PATENT DOCUMENTS

JP 2006-195821 7/2006
JP 2012-163995 8/2012
(Continued)

*Primary Examiner* — Farley Abad
*Assistant Examiner* — Getente A. Yimer
(74) *Attorney, Agent, or Firm* — Kile Park Reed & Houtteman PLLC

(57) ABSTRACT

Disclosed herein are a PCI Express switch and a computer system using the switch, which do not require a separate switch device for communication between computers, and enable a switch to be mounted in each PCI Express (PCIe) device, thus enabling main memory to be shared between the computers. The PCI Express switch is employed in a computer system, and includes a downstream port for transmitting a packet, and an upstream port for receiving the packet, wherein the downstream port and the upstream port are directly connected to another computer system. The present invention has a structure which enables the memory of other computers to be accessed by changing only the structure of a switch within a computer. Accordingly, there is an advantage in that the memory of other computers can be directly accessed without requiring a separate switch device or complicated software for a connection between computers.

2 Claims, 9 Drawing Sheets

(51) Int. Cl.
    *G06F 13/36*    (2006.01)
    *G06F 13/20*    (2006.01)
(58) Field of Classification Search
    USPC .......................................................... 710/316
    See application file for complete search history.

(56) References Cited

U.S. PATENT DOCUMENTS

| | | | |
|---|---|---|---|
| 2006/0174048 A1 | 8/2006 | Ohara et al. | |
| 2007/0067551 A1* | 3/2007 | Ikeda | G06F 9/468 710/315 |
| 2008/0209099 A1 | 8/2008 | Kloeppner et al. | |
| 2010/0017549 A1* | 1/2010 | Harriman | G06F 13/4022 710/104 |
| 2010/0250807 A1* | 9/2010 | Miyoshi | G06F 13/4027 710/110 |
| 2010/0250823 A1* | 9/2010 | Suganuma | G06F 13/4022 710/316 |
| 2011/0185163 A1* | 7/2011 | Hidaka | G06F 13/4022 713/2 |
| 2012/0066428 A1* | 3/2012 | Miyoshi | G06F 13/4022 710/311 |
| 2012/0324139 A1* | 12/2012 | Glaser | H04L 49/35 710/312 |
| 2013/0173839 A1* | 7/2013 | Li | G06F 3/0617 710/316 |
| 2013/0179722 A1* | 7/2013 | Smith | G06F 13/4027 714/4.5 |
| 2013/0254487 A1* | 9/2013 | Tanaka | H04L 49/552 711/123 |

FOREIGN PATENT DOCUMENTS

| | | |
|---|---|---|
| KR | 10-2006-0087364 | 8/2006 |
| KR | 10-2009-0117885 | 11/2009 |

* cited by examiner

US 10,162,780 B2

PCI EXPRESS SWITCH AND COMPUTER SYSTEM USING THE SAME

CROSS REFERENCE TO RELATED APPLICATION

This application claims the benefit of Korean Patent Application No. 10-2012-0147203, filed on Dec. 17, 2012, which is hereby incorporated by reference in its entirety into this application.

BACKGROUND OF THE INVENTION

1. Technical Field

The present invention relates generally to a Peripheral Component Interconnect (PCI) Express switch and a computer system using the switch and, more particularly, to a PCI Express switch and a computer system using the switch, which enable computers to be mutually connected to each other by expanding a virtual PCI bus within the switch to the outside of the switch, and allow the computers to share an upstream bridge within the switch with each other by enabling the upstream bridge to be virtualized as a device in other computers.

2. Description of the Related Art

Peripheral Component Interconnect (PCI) Express technology is a technology for supporting Input/Output (I/O) interfaces between a Central Processing Unit (CPU) and peripheral devices in computer systems. Initially, PCI Express technology was applied to chip-to-chip interfaces or interfaces using slots.

Recently, in order to expand PCI Express to the outside of computer systems, expansion methods using PCI Express cables or other copper and optical cables have been introduced, and so PCI Express interfaces have been used as expansion interfaces on the outside of the system, as well as the inside of the system.

With the development of this technology, methods of clustering computers using PCI Express buses have been proposed. In this case, there has been introduced a method of implementing some of downstream ports in a switch in the form of Non-Transparent (NT) ports, implementing an interface between the NT ports, accessing the NT ports in a software manner to access another computer, and then accessing memory provided in the other computer.

However, when this scheme is implemented, only the memory of computers mutually connected to NT ports can be accessed, and thus n NT ports are required to communicate with n computers, and the introduction of complicated software is required. Further, in order to communicate with a plurality of computers using a limited number of NT ports, a separate switch device is required. Furthermore, a problem arises in that, as the number of connected NT ports in a separate switch device increases, mapping between the NT ports exhibits a very complicated aspect. That is, since the above problem is present in the method using NT ports, a scheme for solving this problem is required so as to directly access the memory of another computer.

Korean Patent Application Publication No. 10-2009-0117885 (entitled "System, cluster port and method") discloses technology for enabling mutual connections between a plurality of independent PCI Express hierarchies so that the clusters of the mutually connected PCI Express hierarchies, which can share access to endpoint devices within arbitrary clustered hierarchies, are formed. The invention disclosed in Korean Patent Application Publication No. 10-2009-0117885 includes a plurality of PCI Express hierarchies, each having a related root controller and a related cluster port, and a PCI Express switch connected to the cluster ports of the respective hierarchies, wherein the cluster port of each hierarchy enables a first hierarchy to gain control access to a component within another arbitrary hierarchy of the plurality of hierarchies through the switch.

That is, the invention disclosed in Korean Patent Application Publication No. 10-2009-0117885 has a structure in which cluster ports are set in the switch to cluster the computers, and which remaps PCI hierarchies and accesses remote components. The invention is configured to reconfigure an address map using a separate switch device and then generate a cluster structure. In other words, the invention disclosed in Korean Patent Application Publication No. 10-2009-0117885 sets specific ports called cluster ports from among switch ports, connects the cluster ports through a switch, and remaps the PCI hierarchies, thus requiring a complicated remapping procedure and also requiring a separate switch structure.

An example of configuration and setup of a PCI Express-based single computer system is illustrated in FIG. 1.

Generally, a computer system includes a host processor (CPU) 10, and memory 12 and a Video Graphics Array (VGA) 14 connected to a root complex 16, and these components are then connected to an endpoint 18.

Here, since the PCI bus number of a port within the root complex 16 is 0, the bus number of the VGA 14 directly connected to the root complex 16 is 1, and the bus number of the endpoint 18 connected to another port is 2.

Depending on the specifications of PCI Express, the endpoint 18 has a constraint in that the device number thereof must be 0, and the function number thereof is designated as 0 in the case of a single function according to usage, and thus the ID of the endpoint 18 is B0D0F0. In this state, a method of enabling the computer system to share its own memory 12 with other systems is not implemented. Accordingly, as shown in FIG. 2, switches 20 and 30, each having a single NT port, are introduced so as to share memory, thus enabling the sharing of memory to be implemented. In FIG. 2, parts for connecting the NT switch 20 and the NT switch 30 are just the NT ports. In this case, since only two computers are connected, a direct connection between the NT ports can be made, and then a separate switch is not needed.

However, in order to connect three or more computers, a separate switch (that is, an NT port routing switch 40) for routing between NT ports is required, as shown in FIG. 3. Since the NT ports are recognized as endpoints in respective systems, separate software device drivers are required for respective computers so as to access the NT ports. Further, in order to map a request or response signal, received through each NT port, to the corresponding computer's memory 12, a complicated algorithm is required. Furthermore, since the switch 40 used to perform routing between the NT ports also requires a complicated algorithm for routing, the use of complicated software and hardware is also required.

SUMMARY OF THE INVENTION

Accordingly, the present invention has been made keeping in mind the above problems occurring in the prior art, and an object of the present invention is to provide a PCI Express switch and a computer system using the switch, which do not require a separate switch device for communication between computers, and enable a switch to be mounted in each PCI Express (PCIe) device, thus enabling main memory to be shared between the computers.

In accordance with an aspect of the present invention to accomplish the above object, there is provided a Peripheral Component Interconnect (PCI) Express switch employed in a computer system, including a downstream port for transmitting a packet; and an upstream port for receiving the packet, wherein the downstream port and the upstream port are directly connected to another computer system.

Preferably, the downstream port and the upstream port may be connected to each other to form a shape of a ring.

Preferably, the downstream port may use its own identification number as a link number and transmit the link number, and the upstream port may set a received link number to its own identification number.

In accordance with another aspect of the present invention to accomplish the above object, there is provided a computer system including memory directly connected to a root complex; and a Peripheral Component Interconnect (PCI) Express switch directly connected to the root complex, and provided with a downstream port for transmitting a packet and an upstream port for receiving the packet, wherein the downstream port and the upstream port are directly connected to another computer system.

Preferably, the downstream port may use its own identification number as a link number and transmit the link number to the other computer system, and the upstream port may set a link number received from the other computer system to its own identification number.

In accordance with a further aspect of the present invention to accomplish the above object, there is provided a computer system including a first computer system including first memory directly connected to a first root complex; and a first Peripheral Component Interconnect (PCI) Express switch directly connected to the first root complex and provided with a first downstream port for transmitting a packet and a first upstream port for receiving the packet; and a second computer system including second memory directly connected to a second root complex; and a second PCI Express switch directly connected to the second root complex and provided with a second downstream port for transmitting a packet and a second upstream port for receiving the packet, wherein the first downstream port, the first upstream port, the second downstream port, and the second upstream port are connected to each other in a shape of a ring.

Preferably, the first downstream port may be connected to the second upstream port, and the first upstream port may be connected to the second downstream port.

Preferably, a link number between the first downstream port and the second upstream port may be different from a link number between the first upstream port and the second downstream port.

Preferably, the first downstream port may use its own identification number as a link number and transmit the link number to the second upstream port, and the second downstream port may use its own identification number as a link number and transmit the link number to the first upstream port.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
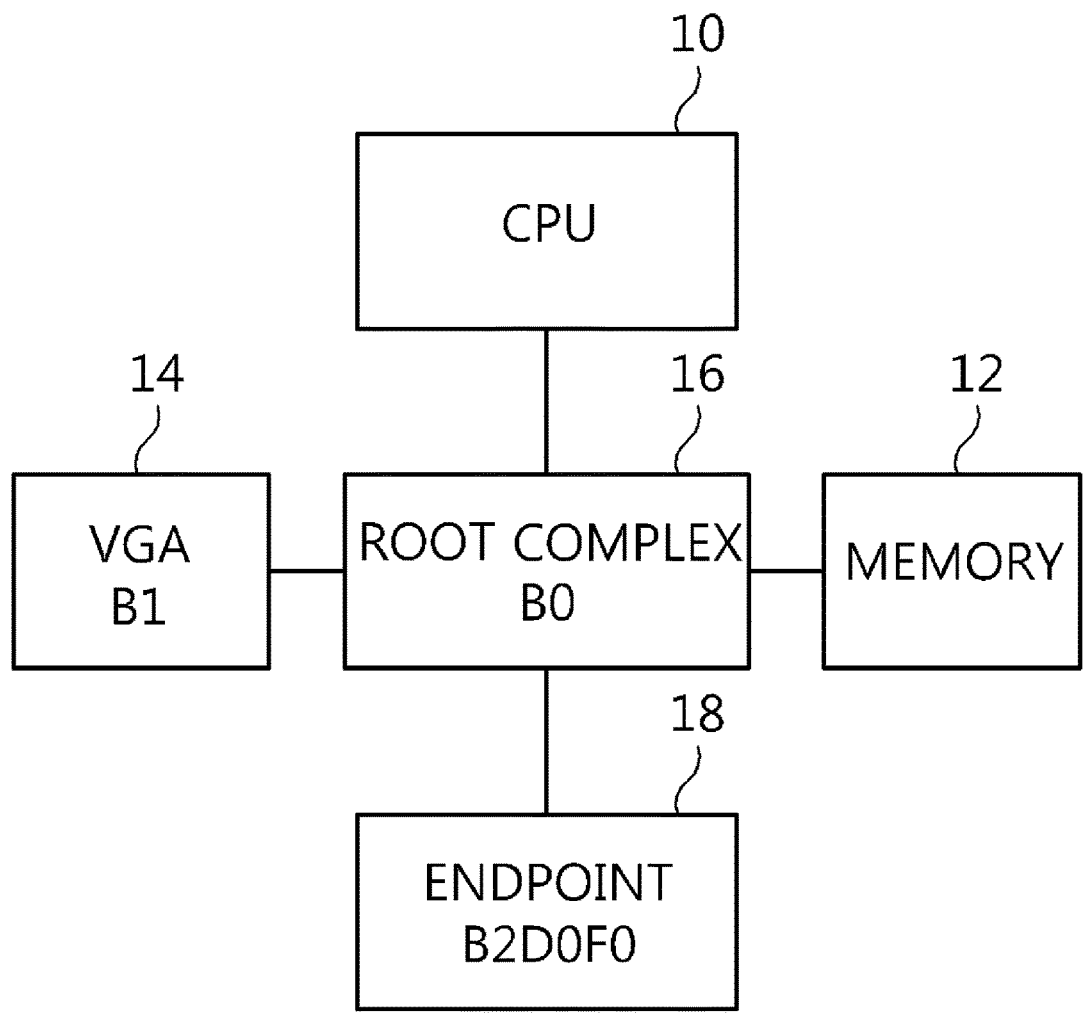
FIG. 1 is a diagram showing an example of the configuration and setup of a conventional PCI Express-based single computer system.
Figure 2:
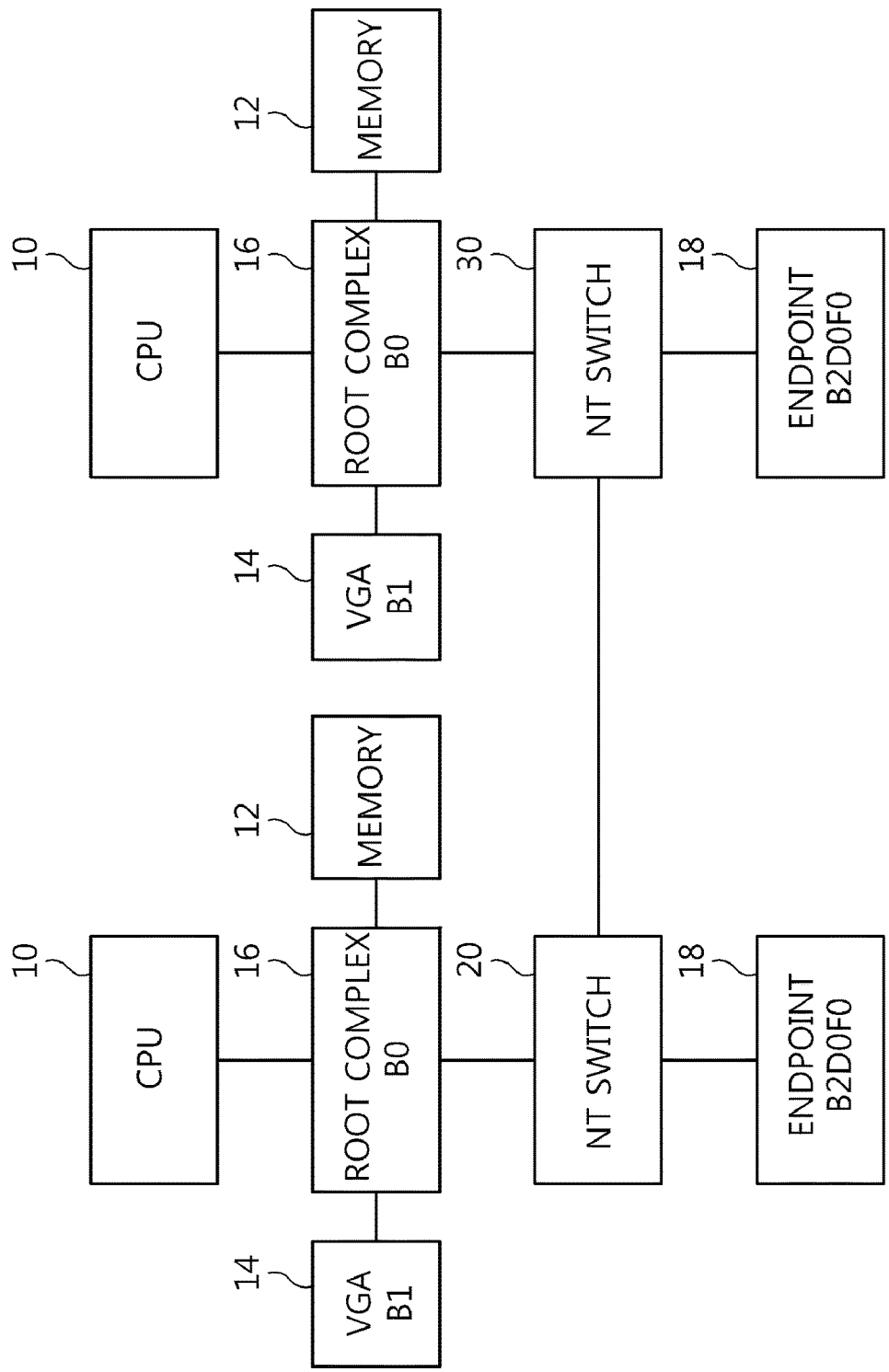
FIG. 2 is a diagram showing a method of implementing the sharing of I/O devices using conventional NT ports.
Figure 3:
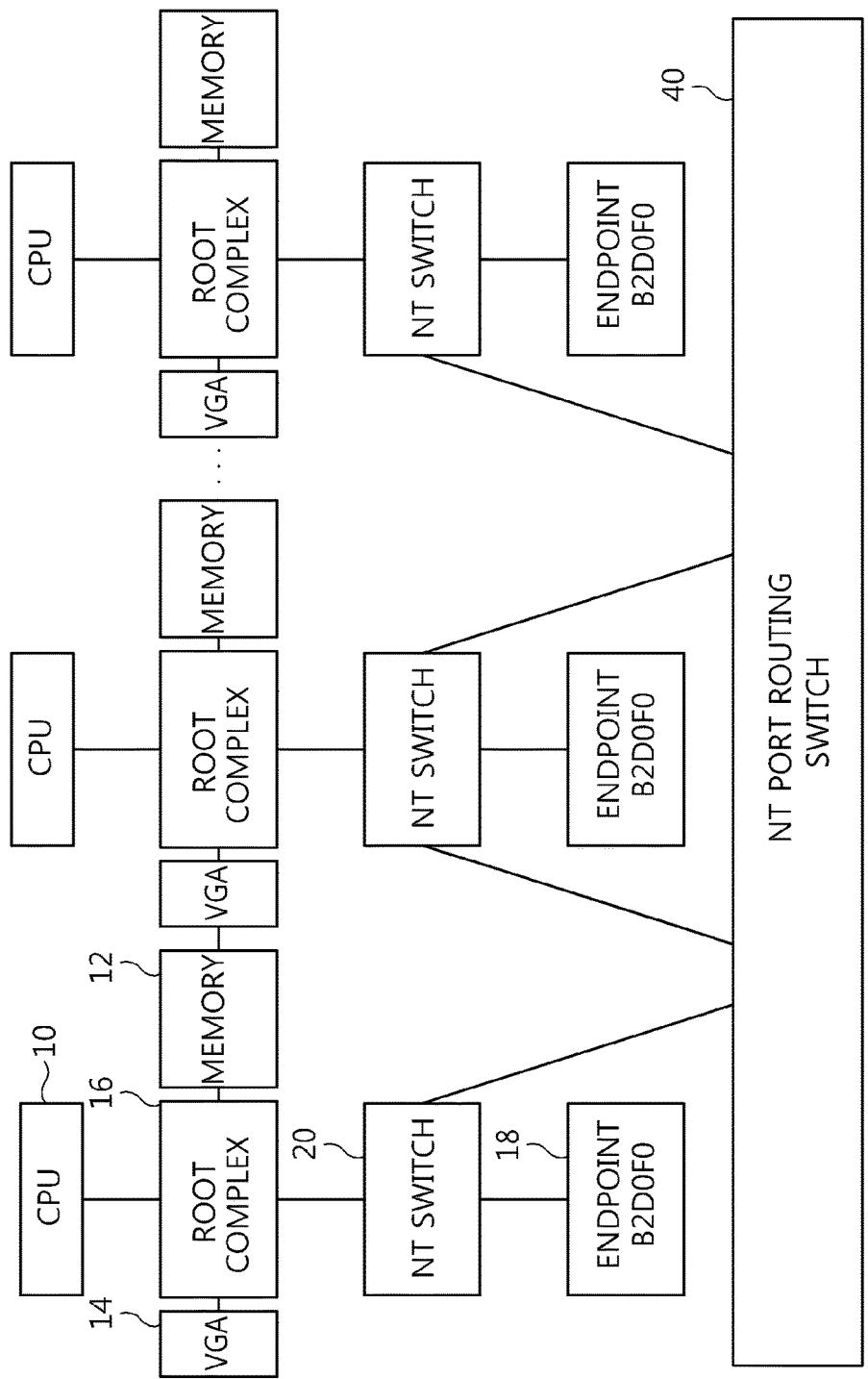
FIG. 3 is a diagram showing an example of the configuration of a conventional system for sharing I/O devices of three or more computer systems.

Hereinafter, a PCI Express switch and a computer system using the switch according to embodiments of the present invention will be described with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

Figure 4:
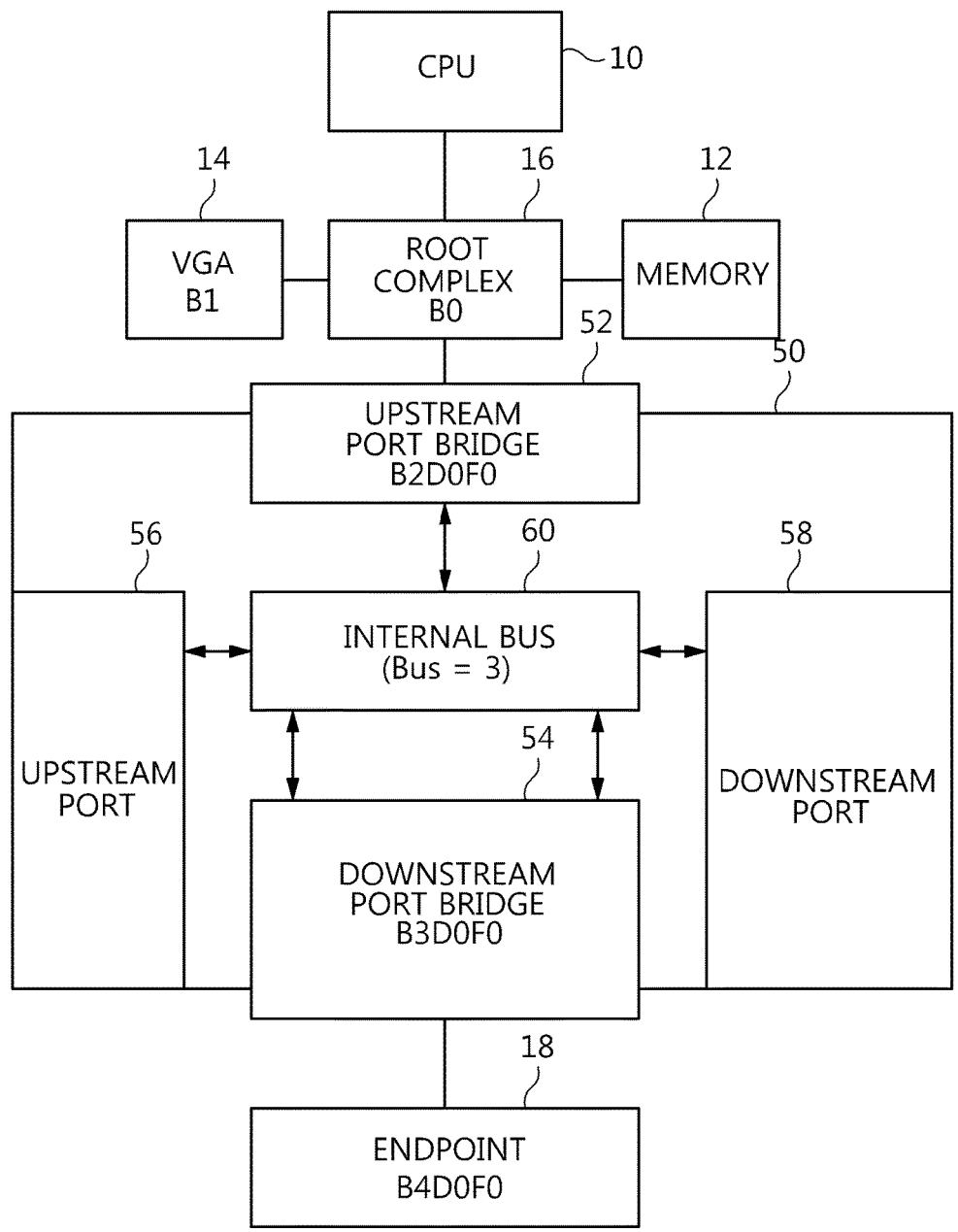
FIG. 4 is a diagram showing an example of the configuration and setup of a computer system having a PCI Express switch according to an embodiment of the present invention.

FIG. 4 is a diagram showing an example of the configuration and setup of a computer system having a Peripheral Component Interconnect (PCI) Express switch according to an embodiment of the present invention.

In FIG. 4, upon setting up a system, a setup request packet is transmitted from the inside of a PCI Express switch 50 using a downstream port (that is, a downstream PCI Express port) 58, except for a downstream port bridge 54 having function number 0.

As shown in FIG. 4, when the computer system is implemented using only a single computer, the downstream port 58 and an upstream port 56 are looped back, or neither port is connected to the computer system.

Identification of each computer is performed using the link number of the downstream port 58, and about 256 computers can be identified. The link number of the upstream port 56 is set to a reception link number. The downstream port 58 transmits a link number using its own self-identification number. For example, in a case where the computer system is implemented using a single computer, as shown in FIG. 4, if the self-identification number is 0, the link number of a downstream physical layer is "0000 0000b." Such an identification number may be set using a dip switch or the like as a hardware-based method, or using Base Address Registers (BAR) in an upstream port bridge 52 as a software-based method.

After the system has initiated setup and searched for the upstream port bridge 52 using a configuration request, it first sends a configuration request for "B3D0F0," which is the completer ID of the downstream port bridge 54, so as to search for a downstream port bridge 54. Since a downstream port bridge 54 having the completer ID is present, the system sends a completion packet (hereinafter referred to as a "completion") as a 'successful completion.' Thereafter, when the system receives a configuration request for a completer ID of "B3D0F1" or more through the upstream port bridge 52, the configuration request must be transmitted to the downstream port 58. When the computer system is implemented using only a single computer, if a device is not connected to the downstream port 58, an internal bus 60 directly generates a completion with unsupported request status, and then indicates that a downstream port bridge having a completer ID of "B3D0F1" or more is not present. If the downstream port 58 and the upstream port 56 are connected to each other, the upstream port 56 connected to the downstream port 58 receives a packet having the same link number as its own identification number. Accordingly, the internal bus 60 generates a completion with unsupported request status and sends the completion to the upstream port 56. The downstream port 58 receives this completion and returns it to the internal bus 60. The internal bus 60 sends the completion to the upstream port bridge 52, and the computer recognizes that a downstream port bridge having a completer ID of "B3D0F1" or more is not present.

In the present invention, when the system is initially set up, the upstream port bridge 52 may store the information of shared memory that can be accessed by another computer using the Base Address Registers (BAR) of the upstream port bridge 52 in an initialization setup stage. This enables another computer to directly access the shared memory when the computer and the other computer are clustered later.

Further, when the system is generally set up, the source transaction ID of configuration access applied to the downstream port bridge has BDF (for example, B2D32F0 or the like) originally designated by a root complex, rather than having BDF ("B2D0F0" in FIG. 4) applied by the upstream port bridge. However, in the present invention, upon gaining configuration access, a value used by a link as its identification number (0 in a single computer) is used as a bus number, and a device number and a function number are fixed at 0, so that the source transaction ID is set to a value transmitted from the corresponding computer. Values received from other computers are configured to have different bus numbers, thus enabling configuration access made by the corresponding computer to be distinguished from configuration access made by other computers.

Figure 5:
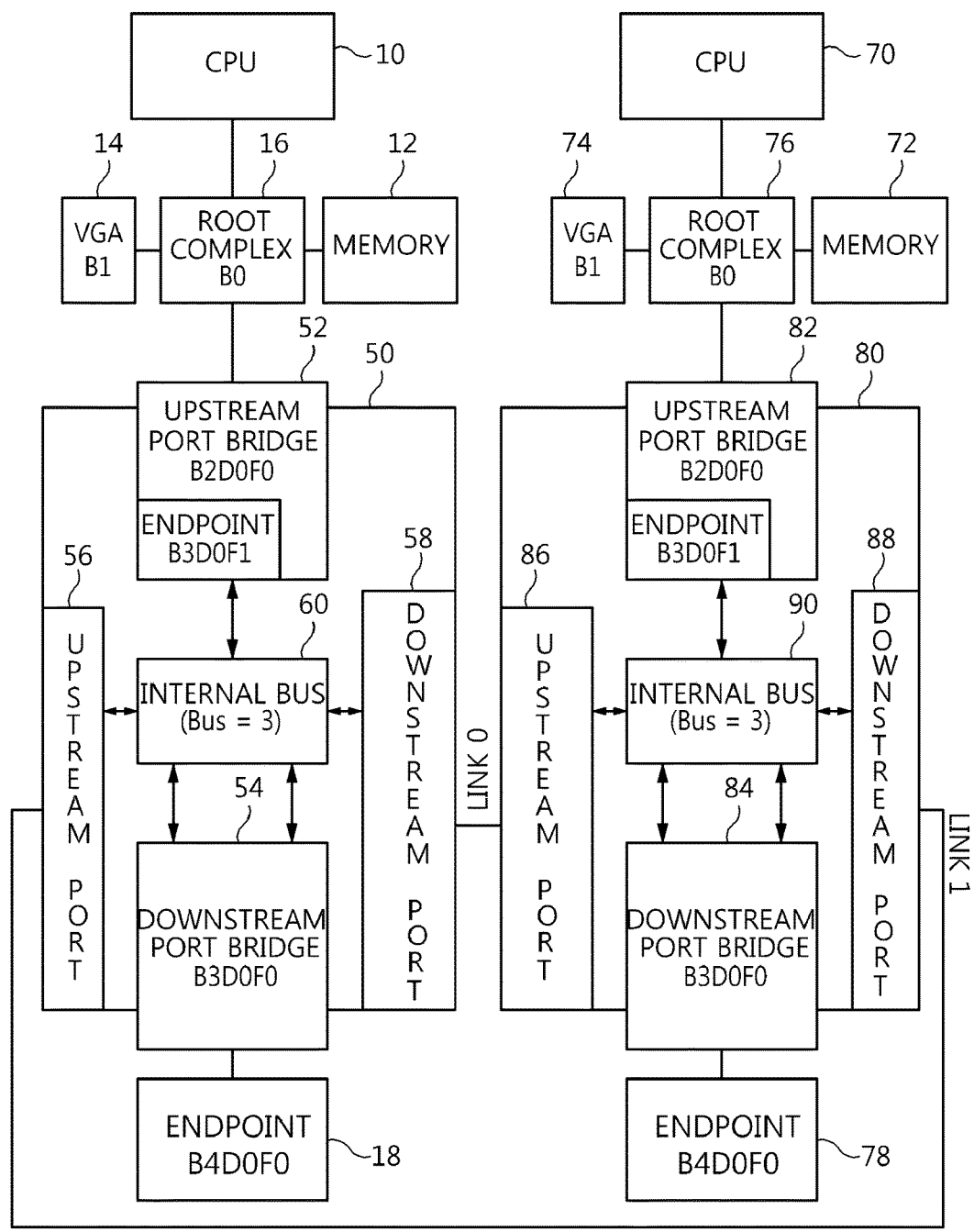
FIG. 5 is a diagram showing a shape in which two computer systems are mutually connected according to an embodiment of the present invention.

FIG. 5 is a diagram showing a shape in which two computer systems are mutually connected according to an embodiment of the present invention. In FIG. 5, a left computer system may be designated as a first computer system, and a right computer system may be designated as a second computer system.

In FIG. 5, when the left computer system is initialized, it searches for an upstream port bridge (B2D0F0) 52 using a configuration Transaction Layer Packet (TLP), and also searches for its own downstream port bridge (B3D0F0) 54. After the upstream port bridge 52 and the downstream port bridge 54 have been found, the left computer system transmits a configuration TLP required to search for upstream port bridges having a completer ID of "B3D0F1" or more to the downstream port 58. In this case, the configuration TLP reaches the upstream port 86 of the right computer system through link 0 in which a link number is set to 0, and then reaches an upstream port bridge 82 through the internal bus 90 of the right computer system. Accordingly, the upstream port bridge 82 of the right computer system generates a completion with configuration retry status and sends the completion to the internal bus 90 until memory information that can be shared with external systems is designated in Base Address Registers (BAR). The internal bus 90 transmits the received completion to an upstream port 86. Then, the upstream port 86 sends the completion with configuration retry status to the downstream port 58 of the left computer system. Accordingly, the completion is sent to a root complex 16 via an upstream port bridge 52 after passing through the internal bus 60 of the left computer system. Accordingly, the left computer system recognizes that the right computer system is not prepared to perform configuration.

After the setting of BAR in the upstream port bridge 82 of the right computer system has been completed, a virtual endpoint configuration space is generated. In the virtual endpoint configuration space, a completion is generated. The completion is transmitted to the upstream port 86 after passing through the internal bus 90 of the right computer system, and is then transferred to the downstream port 58 of the left computer system. Accordingly, the completion sequentially passes through the downstream port 58, the internal bus 60, and the upstream port bridge 52 of the left computer system, and finally reaches the root complex 16. Then, the left computer system recognizes that the memory 72 of the right computer system is added as its endpoint device. In this case, since a bus number in the source transaction ID is identical to its own identification number, that is, a link number, the right computer system that received a configuration transaction recognizes the configuration transaction as a configuration transaction requested on just the left side thereof. Accordingly, since a source transaction ID is generated in the same manner in a completion, the left computer system receives the completion, and then forwards the completion to its own upstream port bridge 52.

A method in which the right computer system configures a virtual endpoint in the upstream port bridge 52 of the left computer system is also identical to the method in which the left computer system configures the virtual endpoint in the upstream port bridge 82 of the right computer system. Accordingly, the computer systems can add the memory of the opposite computer system memory as their own endpoints.

Figure 6:
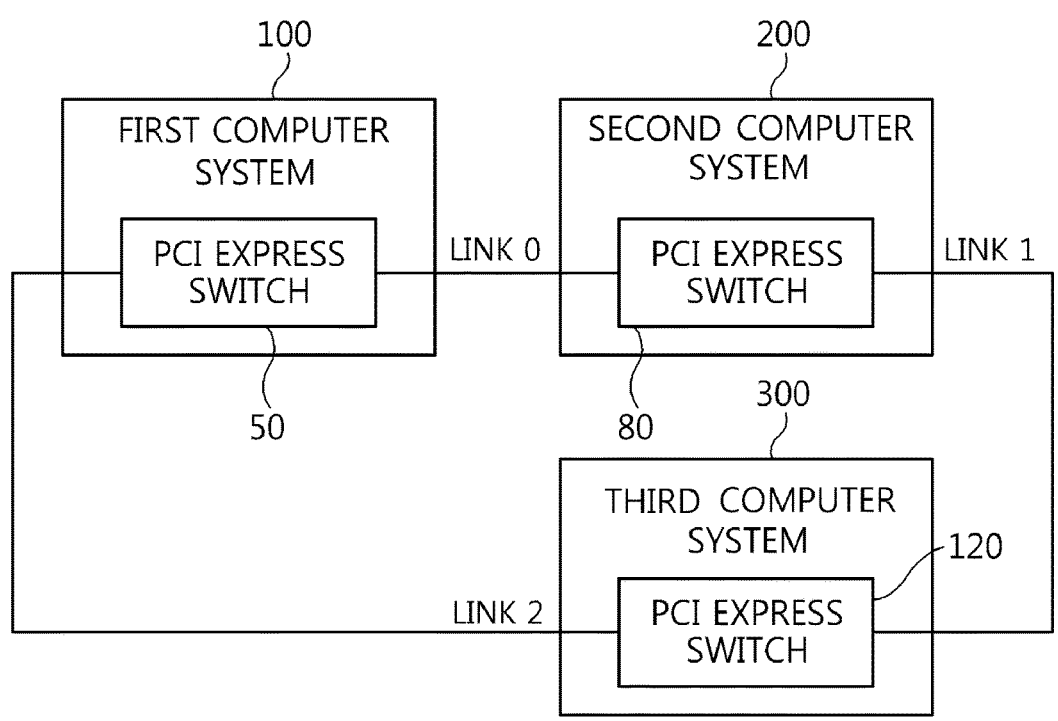
FIG. 6 is a diagram schematically showing a shape in which three computer systems are mutually connected according to an embodiment of the present invention.
Figure 7:
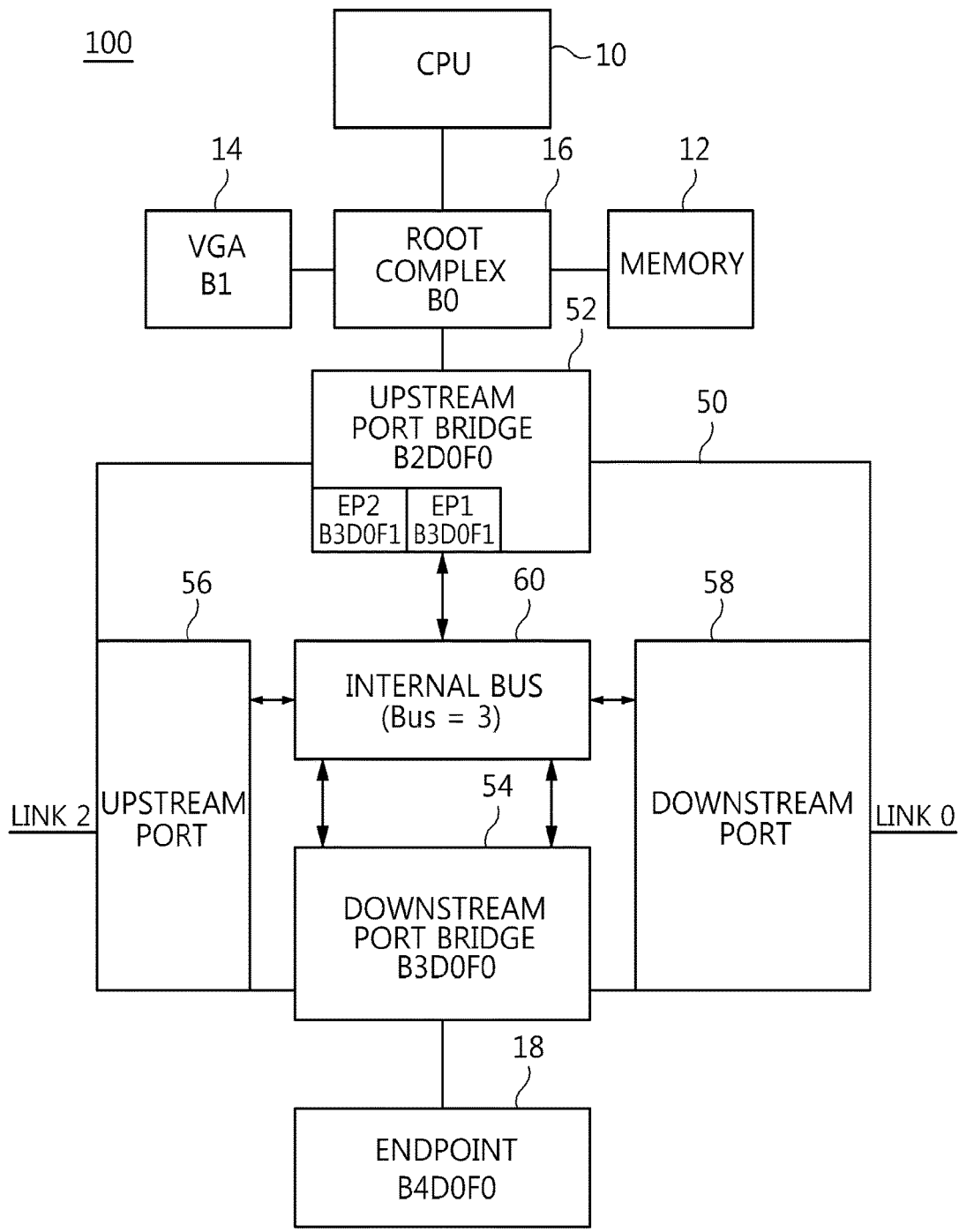
FIG. 7 is a diagram showing the internal configuration of a first computer system shown in FIG. 6.
Figure 8:
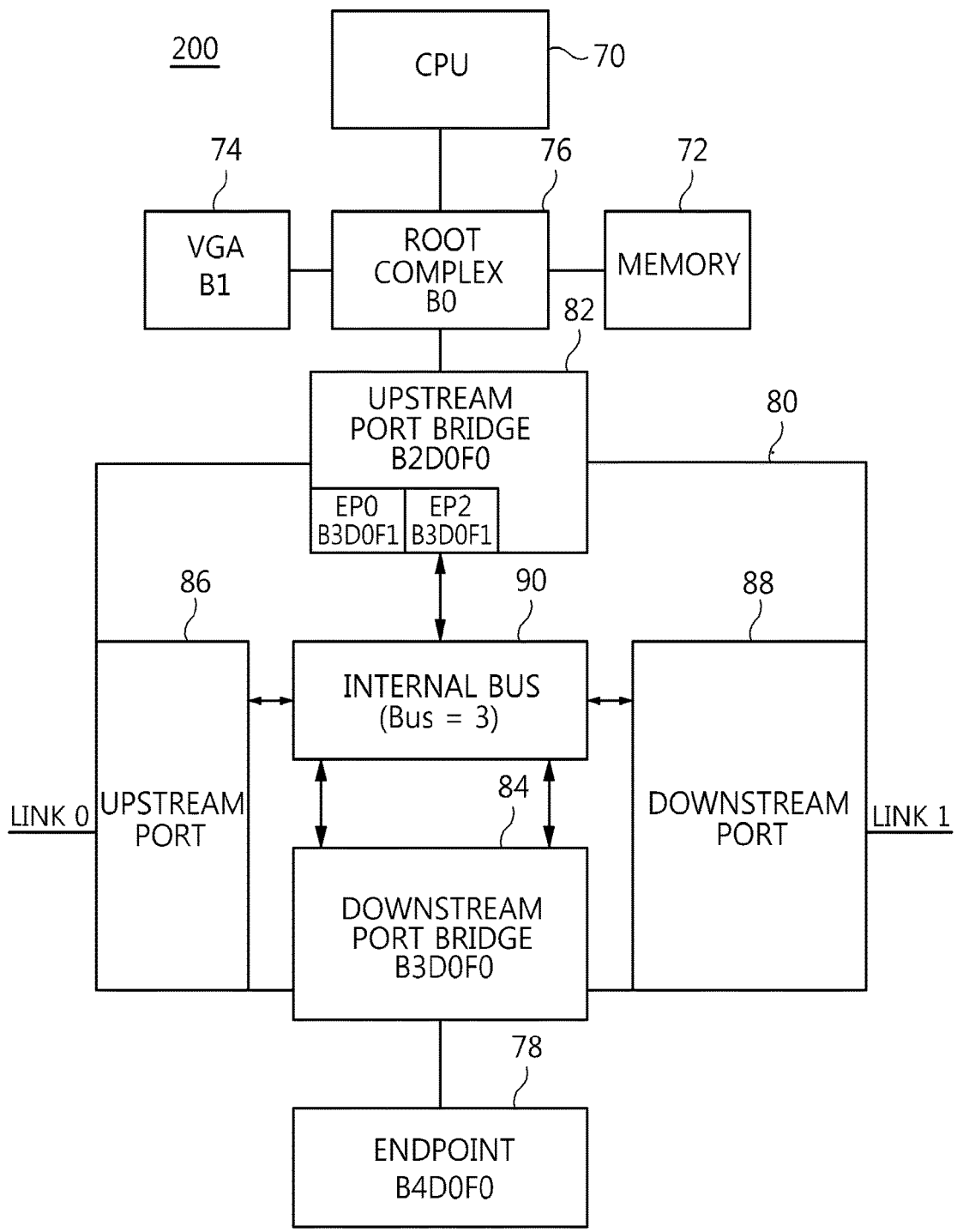
FIG. 8 is a diagram showing the internal configuration of a second computer system shown in FIG. 6.
Figure 9:
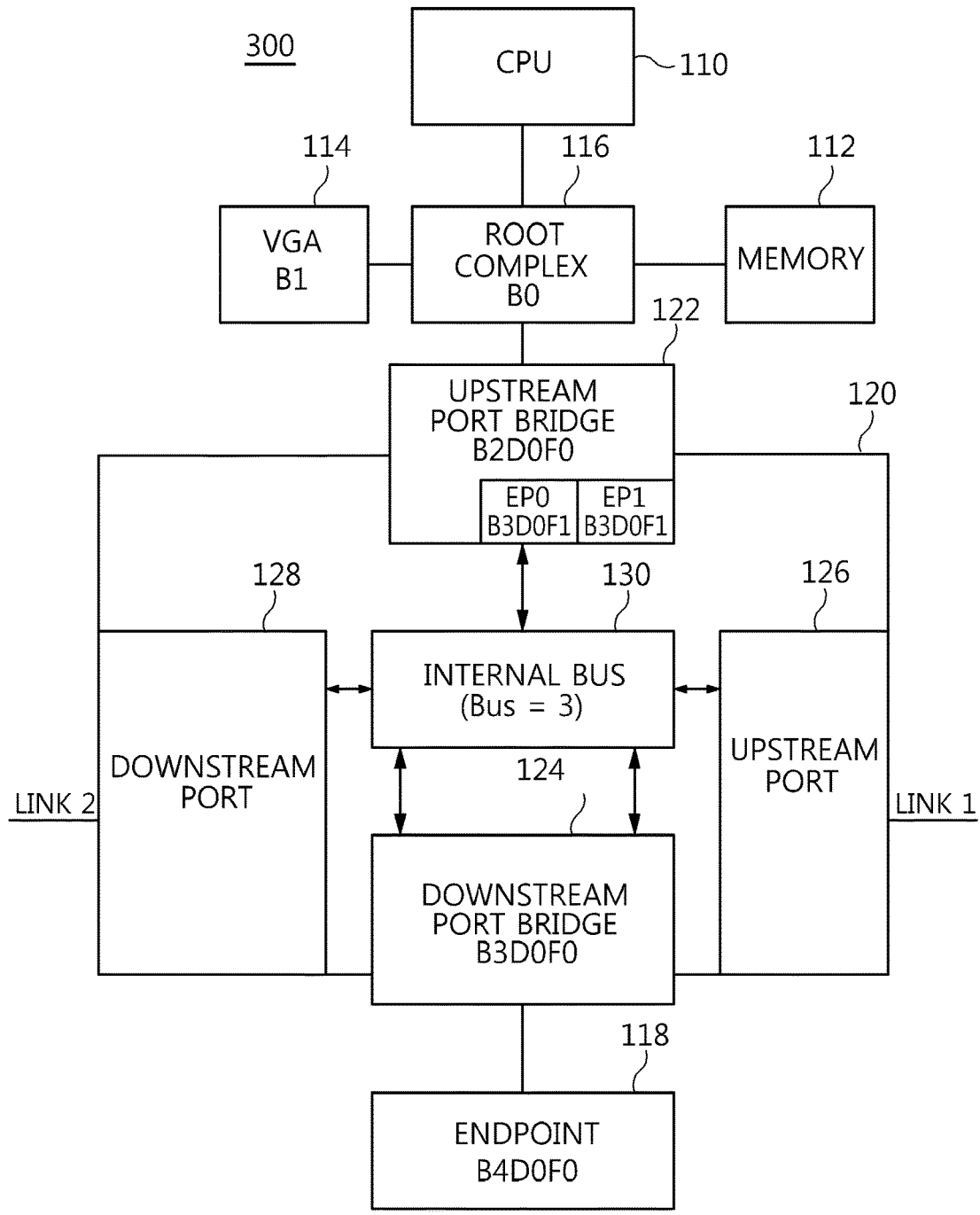
FIG. 9 is a diagram showing the internal configuration of a third computer system shown in FIG. 6.

FIG. 6 is a diagram schematically showing a shape in which three computer systems are mutually connected according to an embodiment of the present invention, FIG. 7 is a diagram showing the internal configuration of a first computer system shown in FIG. 6, FIG. 8 is a diagram showing the internal configuration of a second computer system shown in FIG. 6, and FIG. 9 is a diagram showing the internal configuration of a third computer system shown in FIG. 6.

First, second, and third computer systems 100, 200, and 300 have their own PCI Express switches 50, 80, and 120, respectively. Endpoints generated by the first, second, and third computer systems 100, 200, and 300 to directly access the memory of other computer systems are Ep0, Ep1, and Ep2, respectively. That is, each of the first, second, and third computer systems 100, 200, and 300 generates an endpoint Ep for allowing other computer systems to access its own memory in the upstream port bridge 52, 82 or 122 thereof. Accordingly, other computer systems can access the memory of the relevant computer system.

An additional setting method, performed after the upstream port bridge 52, 82, or 122 and a downstream port bridge 54, 84, or 124 have been set in each of the first, second, and third computer systems 100, 200, and 300, will be described below as an example of the first computer system 100 according to the following sequence:

1. The first computer system 100 receives a configuration request in which a requester ID is "B0DxFx" and a completer ID is "B3D0F1" from a root complex 16.

2. The first computer system 100 transmits a configuration request, in which the requester ID is changed to "B1D0F0" and the completer ID is maintained at "B3D0F1," to its own downstream port 58.

3. The second computer system 200 receives the configuration request through an upstream port 86. Since the requester ID of the received request is "B1" and the completer ID of the request is "D0F1," the second computer system 200 recognizes that the request is a request which the first computer system 100 just adjacent to the second computer system has transmitted to a virtual endpoint within its own upstream port bridge 82. Accordingly, the second computer system 200 generates a completion, in which a completer ID is "B3D0F1" and a requester ID is "B1D0F0," in its own virtual endpoint, and transmits the generated completion to the upstream port 86.

4. After receiving the completion through the downstream port 58, the first computer system 100 recognizes that the completion is a completion responding to the request transmitted thereby because the requester ID of the completion is "B1." Accordingly, the first computer system 100 changes the value of the requester ID of the completion in "B0DxFx" and then transmits the resulting completion to the upstream port bridge 52.

5. The upstream port bridge 52 of the first computer system 100 transmits the received completion to the root complex 16.

6. After the root complex 16 of the first computer system 100 has received the completion, additional setting for "B3D0F1" is performed, and this is carried out based on the above-described 1~5 procedures.

7. The first computer system 100 receives a configuration request, in which a requester ID is "B0DxFx" and a completer ID is "B3D0F2," from the root complex 16.

8. The first computer system 100 transmits a configuration request, in which the requester ID is changed to "B1D0F0" and the completer ID is maintained at "B3D0F2," to its own downstream port 58.

9. The second computer system 200 receives the configuration request through the upstream port 86. Since the requester ID of the request is "B1," but the completer ID is "D0F2," the second computer system 200 recognizes that the request is a request to be forwarded. Therefore, the second computer system 200 forwards the request to its own downstream port 88.

10. The third computer system 300 receives the request through its own upstream port 126. Since the requester ID of the received request is "B1", the third computer system 300 recognizes that the request is a request forwarded from the first computer system 100 rather than the second computer system 200 adjacent to the third computer system. Further, since the completer ID is "D0F2," the third computer system 300 recognizes that the request is a request that is transmitted to a virtual endpoint within its own upstream port bridge 122. Accordingly, the third computer system generates a completion, in which a completer ID is "B3D0F2" and a requester ID is "B1D0F0," in its own virtual endpoint, and transmits the completion to the upstream port 126.

11. The second computer system 200 recognizes that the received completion is not a configuration request generated thereby and forwards the completion to the upstream port 86 because the requester ID of the completion received through the downstream port 88 is "B1D0F0."

12. The first computer system 100 receives the completion through the downstream port 58. Since the requester ID of the completion is "B1," the first computer system recognizes that the completion is a completion responding to the request transmitted thereby, changes the requester ID of the completion to "B0DxFx" and transmits the resulting completion to the upstream port bridge 52.

13. The upstream port bridge 52 of the first computer system 100 transmits the received completion to the root complex 16.

14. After the root complex 16 of the first computer system 100 has received the completion, additional setting for "B3D0F1" is performed, and this follows the above-described procedures 1 to 5.

15. The first computer system 100 receives a configuration request, in which a requester ID is "B0DxFx" and a completer ID is "B3D0F3," from the root complex 16.

16. The first computer system 100 transmits a configuration request, in which the requester ID of the received configuration request is changed to "B1D0F0" and the completer ID is maintained at "B3D0F3," to its own downstream port 58.

17. The second computer system 200 receives the configuration request through the upstream port 86. The second computer system 200 recognizes that the configuration request is a request to be forwarded and forwards the configuration request to its own downstream port 88 because the requester ID of the configuration request is "B1," but the completer ID thereof is "D0F3."

18. The third computer system 300 receives the configuration request through the upstream port 126. The third computer system 300 recognizes that the received configuration request is a request to be forwarded and forwards the configuration request to its own downstream port 128 because the requester ID of the configuration request is "B1," but the completer ID thereof is "D0F3."

19. The first computer system 100 recognizes that the request transmitted thereby has been returned through a forwarding procedure because the requester ID of the request received through the upstream port 56 is "B1." Accordingly, the first computer system 100 generates a completion, in which the requester ID is changed to "B0DxFx" and which has unsupported request status, and transmits the completion to the root complex 16.

20. Since the root complex 16 of the first computer system 100 receives the completion with unsupported request status, it recognizes that access to another memory having a completer ID of "B3D0F3" or more is not present.

Meanwhile, an additional setting method performed by the second computer system 200 and the third computer system 300 is implemented using stages similar to those of the operations of the first computer system 100. Further, even when the number of computer systems is extended to four or more, virtual endpoints for direct access to be made by other computer systems are set in each upstream port bridge using stages similar to those of the above description.

Even when memory in other computer systems is accessed, a requester ID and a completer ID used in a request and a completion use the same mechanism as the method used in a configuration request. However, the size of BAR for remote computer access is determined based on set values of memory to be shared by the corresponding computer system in the BAR provided in an upstream port. Further, when attempting to access its own BAR present in another computer system, the corresponding computer system is separately provided with an address translation logic, and translation between actual physical addresses of a region set by the corresponding computer system and other computer systems is performed. That is, when attempting to access the memory of another computer system, the corresponding computer system uses the BAR set thereby. However, when the virtual endpoint of a remote computer attempts to gain access using an upstream port bridge, the access is attempted using values of the BAR set by the upstream port bridge, and only the results thereof are taken. In this case, as a requester ID, the ID of an upstream port bridge thereof is used, and so violation is prevented from occurring in the system. After a completion responding to a request has been received, the requester ID of the completion is restored to its original requester ID, and then the resulting completion is transmitted to the upstream port.

In accordance with the present invention having the above configuration, the present invention has a structure which enables the memory of other computers to be accessed by changing only the structure of a switch within a computer. Accordingly, there is an advantage in that the memory of other computers can be directly accessed without requiring a separate switch device or complicated software for a connection between computers.

Meanwhile, the present invention is not limited by the above embodiments, and various changes and modifications are possible, without departing from the scope and spirit of the invention. It should be understood that the technical spirit of those changes and modifications belong to the scope of the claims.

What is claimed is:

1. A Peripheral Component Interconnect (PCI) Express switch employed in a computer system, the PCI Express switch comprising:

a downstream port for transmitting only Configuration Transaction Layer Packets (TLPs) to search for an upstream port bridge of another computer system; and an upstream port for receiving only Configuration TLPs from another computer system to generate a virtual endpoint configuration space in an upstream port bridge of the PCI Express switch in the computer system, wherein the computer system using the PCI Express switch recognizes that memory of another computer system is added as an endpoint device of the computer system, wherein the computer system accesses the memory of another computer system, wherein the memory of another computer system is accessed without using Non-Transparent (NT) ports, Advanced Switch (AS) networks, and Multi-Root Aware (MRA) switches, wherein the computer system accesses the memory of another computer system without using separate software or hardware device drivers, and wherein the upstream port bridge stores information of the memory of another computer system using Base Address Registers (BAR) of the upstream port bridge.

2. A computer system comprising:

memory directly connected to a root complex; and a Peripheral Component Interconnect (PCI) Express switch directly connected to the root complex, and provided with a downstream port for transmitting a packet to request for accessing memory of another computer system, and an upstream port for receiving a packet from another computer system to complete accessing the memory of the computer system, wherein the computer system accesses the memory of another computer system, wherein the memory of another computer system is accessed without using Non-Transparent (NT) ports, Advanced Switch (AS) networks, and Multi-Root Aware (MRA) switches, wherein the computer system accesses the memory of another computer system without using separate software or hardware device drivers.

* * * * *